Figure 1:
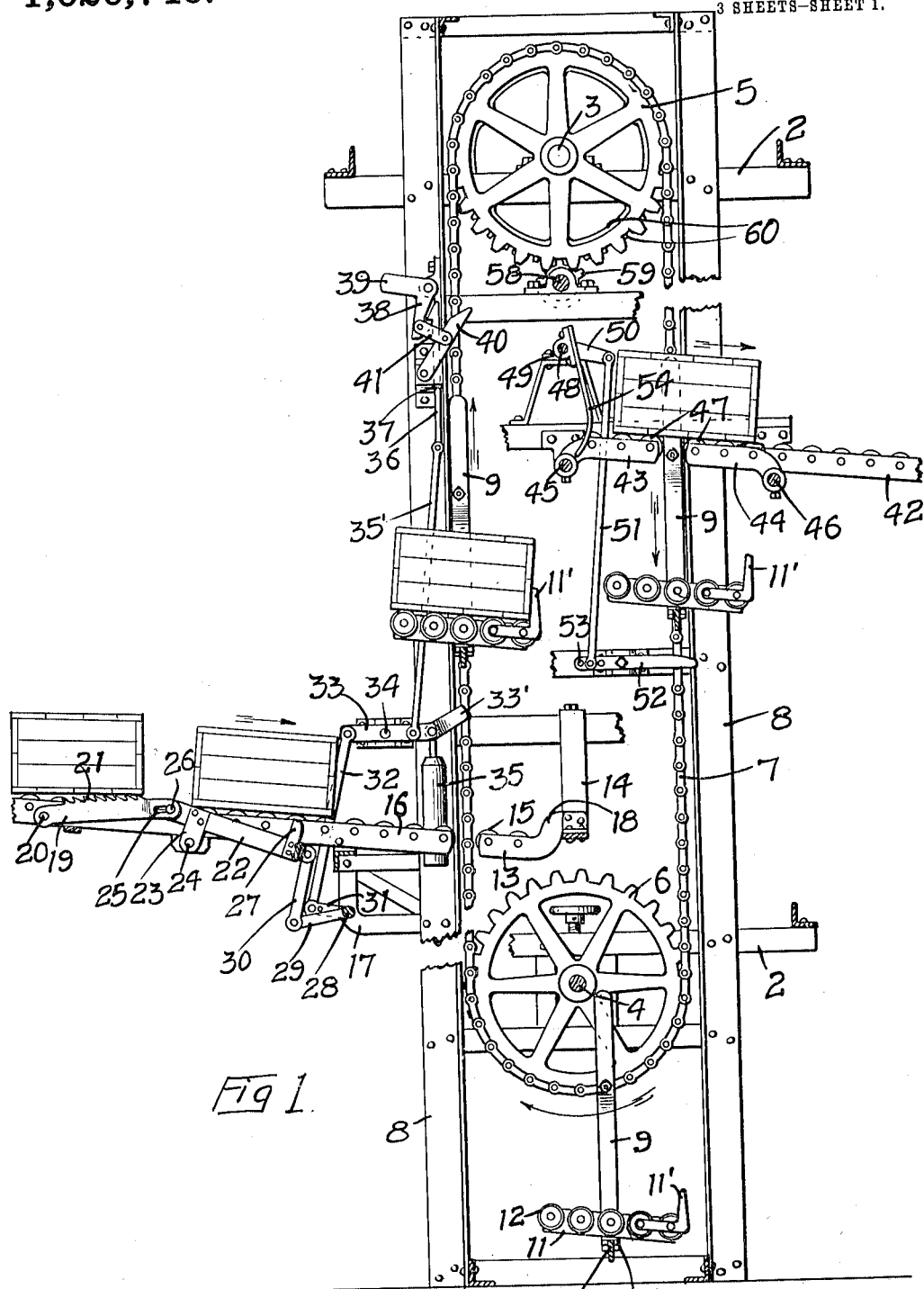

A. S. DEHLER.
ELEVATOR.
APPLICATION FILED APR. 10, 1909.

1,020,746.

Patented Mar. 19, 1912.
3 SHEETS—SHEET 1.

WITNESSES
JMWahlstrom
J. M. Sullivan

INVENTOR
ALBERT S. DEHLER
BY Paul & Paul
HIS ATTORNEYS

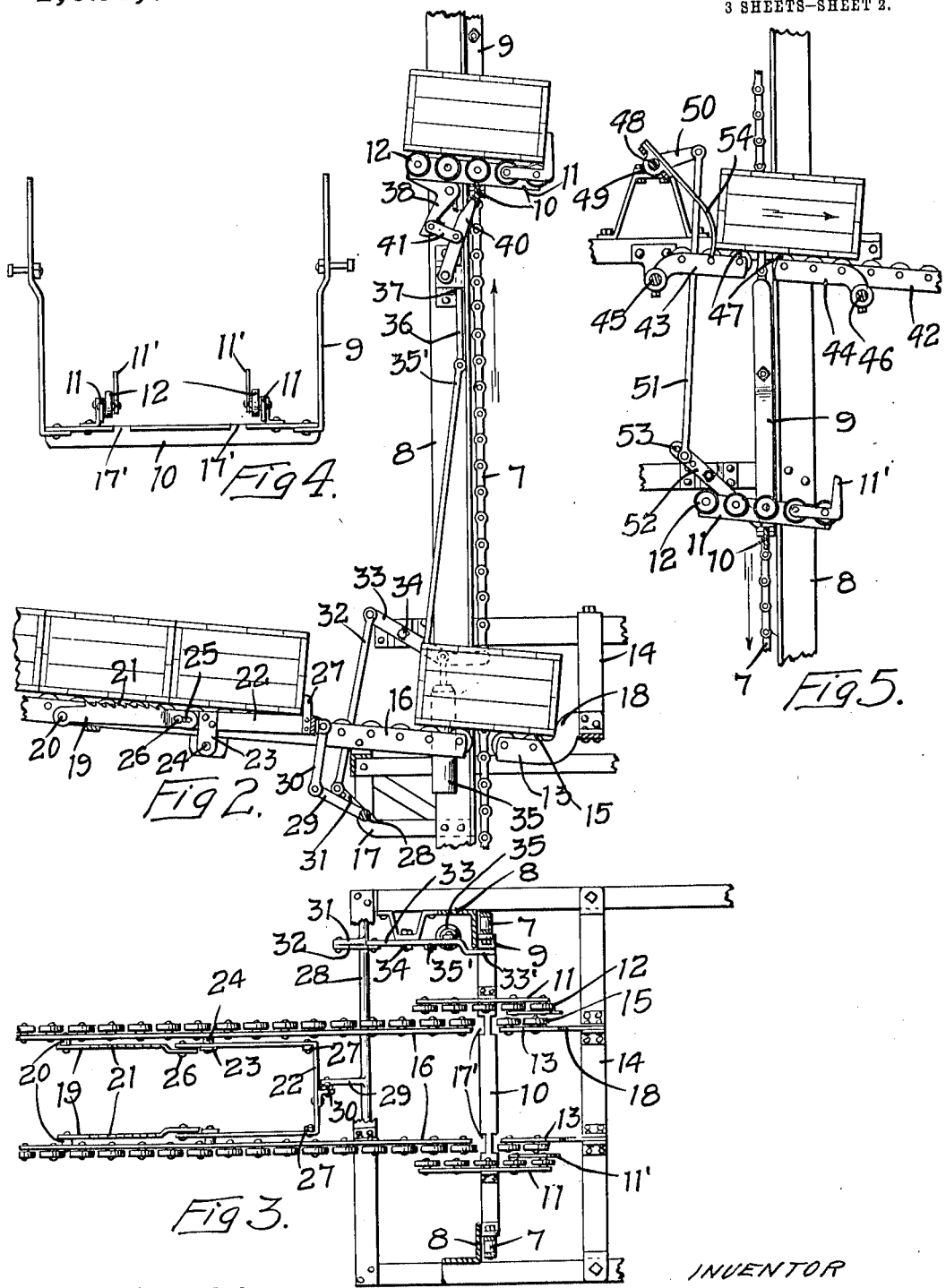

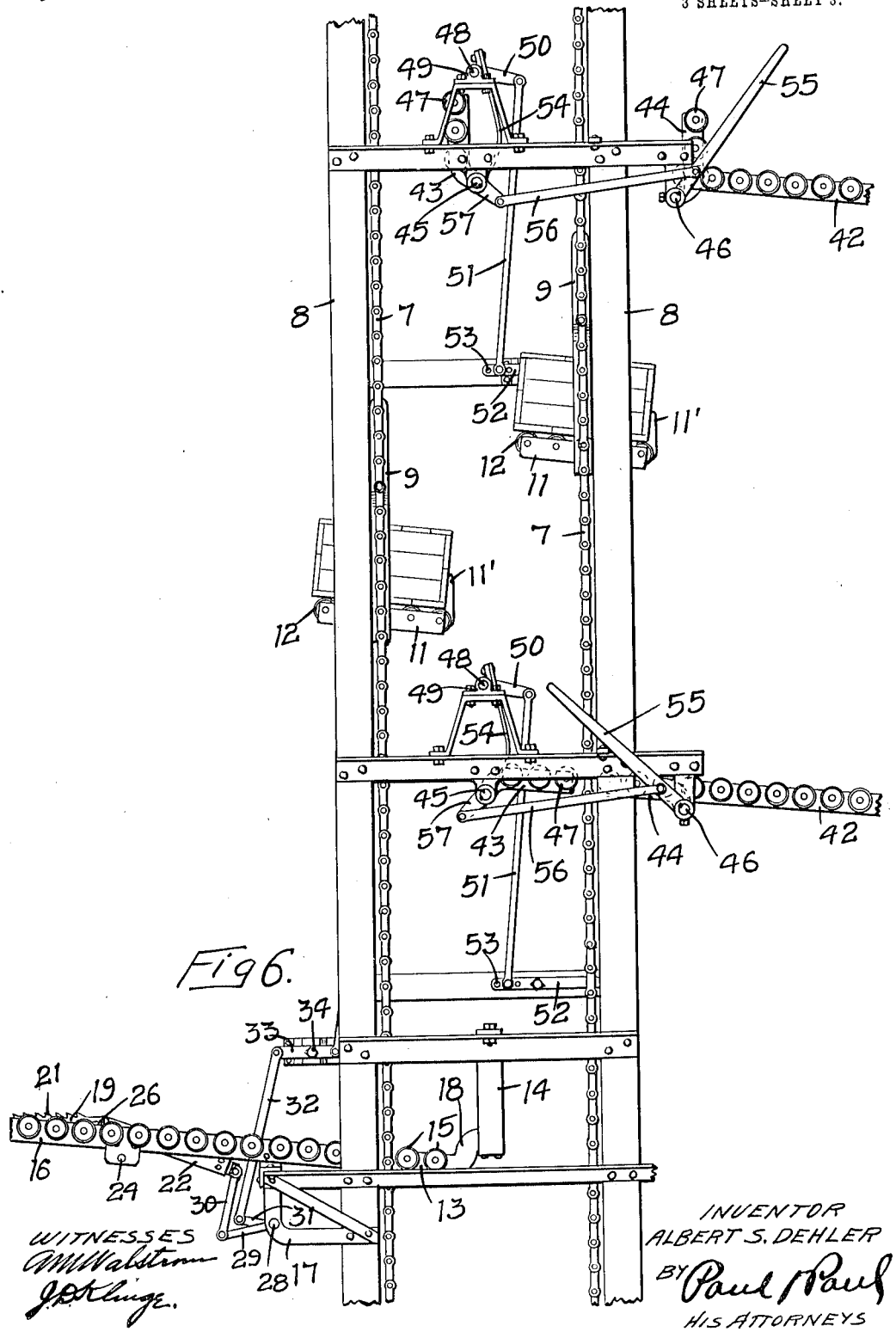

UNITED STATES PATENT OFFICE.

ALBERT S. DEHLER, OF MINNEAPOLIS, MINNESOTA, ASSIGNOR TO MATHEWS GRAVITY CARRIER COMPANY, OF ST. PAUL, MINNESOTA, A CORPORATION OF MINNESOTA.

ELEVATOR.

1,020,746. Specification of Letters Patent. Patented Mar. 19, 1912.

Application filed April 10, 1909. Serial No. 489,102.

*To all whom it may concern:*

Be it known that I, ALBERT S. DEHLER, of Minneapolis, Hennepin county, Minnesota, have invented certain new and useful Improvements in Elevators, of which the following is a specification.

My invention relates to elevators designed for use in connection with gravity carriers, to receive packages on one floor or level and elevate or lower them for delivery onto another floor or level.

The object of the invention is to provide an apparatus by means of which the delivery of the packages to the carriers will be automatically controlled, so that no blockading or clogging of the elevating mechanism can take place through the accumulation of several packages on the receiving or discharge side of the elevator.

My invention consists generally in a mechanism actuated by the movement of the carriers for delivering the packages one at a time, step by step, to the carriers.

In the accompanying drawings, forming part of this specification, Figure 1 is a vertical, sectional view of an elevator, embodying my invention; Fig. 2 is a detail view, showing a package in the path of the carriers, Fig. 3 is a top view illustrating the arrangement of the elevating carrier with respect to the gravity sections, Fig. 4 is a detail view of one of the elevating carriers. Fig. 5 illustrates the mechanism provided on the down side of the elevator for insuring the discharge of a package from the elevating carrier, Fig. 6 illustrates the receiving carrier on the down side of the elevator, thrown to an inoperative position, as when it is desired to deliver the packages on a lower level.

In the drawing, 2 represents a portion of the elevator frame, having upper and lower shafts 3 and 4 journaled therein and supporting sprocket wheels 5 and 6, the wheels on the same side of the frame being connected by belts 7. Vertical angle bars 8 are provided having flanges, with which belts 7 contact and are guided thereby. Between these belts, bails 9 are pivoted at intervals having cross bars 10, on which bars 11 are transversely arranged carrying anti-friction wheels 12. Stops 11' are provided at the inner end of the elevating carrier. Rails 13 are secured to a hanger 14 and provided with anti-friction wheels 15, and rails 16, forming the inner end of a stationary gravity carrier, are supported on a bracket 17 and are provided with anti-friction wheels similar to those described and arranged to conduct the packages by gravity from a distant point and deliver them into the path of the elevating carrier. The inner ends of the rails 16 are spaced from the rails 13 to permit the passage of the bar 10, suitable notches 17' being formed in said bar to permit the ends of the rails to be adjusted close to one another and avoid too great a space between the anti-friction wheels of the rails 13 and 16.

As indicated in Fig. 3, the bars 11 pass up the elevator outside of the rails 13 and 16 in position to pick up a package resting on or supported by said rails and deliver it at another point on the elevator. The rails 13 have offsets 18 at their inner ends, which form stops for the packages, preventing them from sliding inwardly too far or out of the path of the elevating carrier. Between the rails 16, I provide bars 19, pivoted at 20 on the rails 16 and preferably having teeth 21 in their upper edges which are adapted to contact with the under side of the package passing over the rails 16 and check movement of the same toward the elevator. A yoke 22 has arms 23 secured thereon, pivoted at 24 below the rails 16 and having a sliding pivotal connection with the bars 19 by means of slots 25 and pins 26 sliding therein. The inner end of the yoke 22 is provided with stops 27 and which, when the bail is tilted, are moved to a point above the level of the anti-friction wheels on the rails 16 and serve as stops to prevent movement of the packages toward the elevator and into the path of the elevating carrier. A shaft 28 is journaled below the rails 16 and has an arm 29 thereon, which is pivotally connected with the yoke 22 by a link 30. A second arm 31 is provided on said shaft, pivotally connected by a rod 32, with a lever 33, which is pivoted at 34 on the elevator frame and carries a weight 35, which normally tends to draw the rod 32 upward and elevate the yoke 22 into the path of the incoming package. The lever 33 has an upwardly-turned end 33' in the path of the cross bar on the elevating carrier. A rod 35' is pivotally connected with the lever 33 and to one end of a hook 36 that is slidable in a guide 37. A dog 38, having a weighted end 39, is arranged to normally engage said hook and lock it in its raised position and hold the yoke 22 in its depressed position against the weight 35. A latch 40 is pivoted in the path of the ascending carrier and has a link 41 connecting it with the dog 38, and when this latch is struck by the ascending carrier, the dog will be disengaged, the weight 35 will oscillate the lever 33 and raise the yoke and the stops 27 into the path of the incoming box or package. The yoke, in its depressed position, elevates the toothed bars 19 above the level of the anti-friction wheels and the engagement of these teeth with the packages, will hold the packages back and only permit them to pass one at a time over the toothed bars toward the elevator. The mechanism thus operates in a manner somewhat similar to an escapement.

When the yoke 22 is raised, it will assume the position shown in Fig. 2, where the stops 27 will be raised above the anti-friction wheels and movement of the packages toward the elevator will be positively prevented. The weight 35 will normally tend to hold the yoke 22 in its raised position, as indicated in Fig. 2, and check further movement of the packages toward the elevating carrier. As the carrier ascends, its cross bar will engage the projecting end of the lever 33 and lift the weight, lower the yoke 22 and release the foremost package, and at the same time, the bars 19 will be raised and the teeth 21 will contact with the second package and hold it back while the forward one is sliding into the path of the elevating carrier. This engagement of the carrier with the end of the lever 33 will lift the rod 35' and the hook 36 into locking engagement with the dog 38, said dog having been tripped by the preceding carrier. Each carrier therefore, as it picks up a package, sets mechanism, tripped by the latch 40, in position to be released when the carrier reaches it. The package on the carrier will by this time have moved out of the path of the incoming package and there will be no danger of collision or clogging of the elevator through an accumulation of packages at the receiving point. I am thus able to maintain perfect control over the delivery and avoid all danger of overloading or clogging the carrier, as frequently happens in devices of this kind, as usually constructed.

The packages, upon passing to the downside of the elevator, are discharged at a higher or lower level upon a downwardly-inclined carrier section, which I will indicate by the reference numeral 42, it being understood that this carrier leads to some distant point where it is desired to discharge the packages.

At the inner end of the carrier 42, I provide receiving sections 43 and 44 supported upon shafts 45 and 46 and having anti-friction wheels 47, whose peripheries form continuations of the anti-friction wheels of the carrier 42. The ends of these carrier sections 43 and 44 are spaced apart to allow the passage of the elevating carrier in its descent and as the carrier passes by the sections 43 and 44, the package will be removed and allowed to pass by gravity on to the carrier 42.

To insure the discharge of the package from the sections 43 and 44, I provide a shaft 48 journaled at 49 and having a crank arm 50, pivotally connected by a rod 51 with a lever 52, said lever having a series of holes 53 therein, by means of which the stroke of the rod and the travel of the crank arm 50 can be regulated. This lever 52 is in the path of the descending carrier and is operated thereby and arms 54 are mounted on the shaft 48 and project downwardly toward the carrier sections 43 in position to engage the end of the package thereon and accelerate its movement or insure its discharge from the carrier sections when the lever 52 is operated.

It is sometimes desirable to discharge the package on a lower level and in that case, I provide means for swinging the sections 43 and 44 out of the path of the elevating carrier, said means consisting of a lever 55, mounted on the shaft 46 and having a link connection 56 with an arm 57 on the shaft 45. When therefore, the shaft 46 is oscillated, the carrier sections 43 and 44 will be raised to the position indicated in Fig. 6 out of the path of the elevating carrier. For driving the elevator, I provide a shaft 58 having a pinion 59 meshing with a gear 60 on the shaft 3.

I claim as my invention:—

1. The combination, with an elevator and a carrier therefor, of a gravity carrier arranged to deliver packages into the path of said elevating carrier, oscillating toothed bars in the path of the packages moving over said gravity carrier, means for normally holding said bars in position to engage the bottoms of the packages and check the movement of said packages, and means actuated by the movement of said carrier for tilting said toothed bars at a predetermined point in the movement of said carrier and allowing a package to move into the path of an elevating carrier.

2. The combination, with an elevator, including a belt, a carrier supported thereon, of a gravity carrier arranged to deliver packages into the path of said elevating carrier, toothed bars arranged to engage the bottom of an incoming package and arrest movement of the same, means pivotally connected with said toothed bars and including stops adapted to move into the path of the packages and hold them temporarily after passing said toothed bars, and means actuated by the movement of the elevator belt for withdrawing said toothed bars out of engagement with the package and moving said stops into the path of the package.

3. The combination, with an elevator, including a belt and a carrier supported thereby, of a gravity carrier arranged to deliver packages into the path of said belt, a device including toothed bars, and a yoke pivotally connected therewith and provided with stops normally below the level of the upper surface of said gravity carrier, the teeth of said bars normally projecting into position to engage the bottom of the incoming package to check movement of the same, and means actuated by the movement of said elevating carrier for tilting said bars and yoke to release the packages, substantially as described.

4. The combination, with an elevator, including a belt and a package carrier supported thereon, a gravity carrier arranged to deliver packages into the path of said elevating carrier, means for checking the movement of an incoming package, a weighted lever pivotally connected with said checking means, a locking device connected with said lever, and a latch arranged in the path of said elevating carrier and actuated by the movement thereof to trip said lock device.

5. The combination, with an elevator, including an elevating belt and a carrier therefor, of a gravity carrier arranged to deliver packages into the path of said elevating carrier, means engaging the bottoms of the packages for temporarily retarding the packages on said gravity carrier, means actuated by said elevating carrier during its initial movement after picking up a package from said gravity carrier for operating said retarding means to release the foremost package, and means actuated by the further movement of said elevating carrier for returning said retarding means to its normal arresting position, substantially as described.

6. The combination, with an elevator, including an elevating belt and a carrier supported thereon, of a gravity carrier arranged to deliver packages into the path of said elevating carrier, means including a pivoted yoke arranged to swing into the path of the approaching packages on said gravity carrier to engage the bottoms of the packages and arrest movement thereof, means actuated by the elevating carrier during its initial movement after picking up a package from said gravity carrier for oscillating said yoke to release the foremost package held thereby, means controlled by the movement of said yoke for retarding the second package during the delivery of the first one, substantially as described.

7. The combination, with an elevator, including an elevating belt and a carrier supported thereon, of a gravity carrier arranged to deliver packages into the path of said elevating carrier, means including a pivoted yoke for engaging the bottoms of the packages and temporarily arresting the movement of the packages on said gravity carrier, means actuated by the elevating carrier during its initial movement after picking up a package to operate said yoke and release the foremost package, and means operated by said elevating carrier during a later portion of its movement for releasing said yoke and permitting it to return to its normal arresting position, substantially as described.

8. The combination, with an elevating carrier, a gravity carrier arranged to deliver packages into the path of said elevating carrier, means arranged to engage the bottom of the package and retard an incoming package, means pivotally connected with said retarding means and adapted to move into the path of the packages and stop them temporarily after passing said retarding means, and means actuated by the movement of the elevating carrier for withdrawing said retarding means out of engagement with the package and moving said stopping means into the path of the package.

9. The combination, with an elevator including an elevating belt and carrier thereon, of a gravity carrier arranged to deliver packages into the path of said elevating carrier, arresting means arranged to move into the path of the approaching package on said gravity carrier to engage the bottom thereof, means actuated by said elevating carrier at a predetermined point in its movement for operating said arresting means to release the foremost package, and means pivotally connected with said arresting means for retarding the second package during the delivery of the first one.

10. The combination, with an elevator including a belt and a package carrier supported thereon, a gravity carrier arranged to deliver packages into the path of said package carrier, means for checking the movement of an incoming package, means pivotally connected with said checking means, a locking device therefor, and a latch actuated by the movement of said package carrier to trip said locking device.

11. The combination, with an elevating carrier and a gravity carrier arranged to deliver packages into the path of said elevating carrier, of means adapted to move into the path of the packages and stop them temporarily on said gravity carrier, means adapted to be actuated by the initial movement of said elevating carrier after picking up a package and connected with said stop means to depress it and release the package, means for locking said stop means in its depressed position, and means actuated by the subsequent movement of said elevating carrier for tripping said locking means and permitting said stop means to return to its normal operative position.

12. The combination with an elevator and an elevating carrier supported thereon, of a discharge carrier normally stationary provided on the down side of said elevator and arranged to receive the package from said elevating carrier, a rock shaft extending transversely of said stationary carrier, arms mounted thereon and depending in the rear of the package on said stationary carrier, a lever arranged in the path of said elevating carrier, said rock shaft having a crank arm, a link pivotally connected therewith and having an adjustable connection with said lever, whereby the movement of said crank arm and the oscillation of said arms may be regulated, for the purpose specified.

13. The combination, with an elevator and an elevating carrier supported thereon, of a discharge carrier normally stationary provided on the down side of said elevator and composed of parallel rails having spaces between them and antifriction wheels mounted on said rails and forming carrying surfaces, a rock shaft, arms depending therefrom between said rails and in the rear of the package on said stationary carrier, and means actuated by the descent of said elevating carrier after passing said stationary carrier for rocking said shaft and oscillating said arms, for the purpose specified.

14. The combination, with an elevator including a belt and a package carrier supported thereon, of a gravity carrier arranged to deliver packages into the path of said elevating carrier, means engaging the bottom of a package for stopping the movement thereof, a weighted lever pivotally connected with said stopping means and normally tending to hold it in its raised or operative position, said lever projecting into the path of said package carrier to be tilted thereby to depress said stopping means and release the foremost package at a predetermined point in the movement of said package carrier.

15. The combination, with an elevator including an elevating belt and a carrier therefor, of a gravity carrier arranged to deliver packages in the path of said elevating carrier, a stop device arranged to move into the path of the incoming packages, a pivoted lever operatively connected with said stop device and projecting into the path of said elevating carrier to be actuated thereby, a hook device connected with said lever, a dog engaging said hook device to lock said lever in its raised position, and a latch connected with said dog and projecting into the path of said elevating carrier to be actuated thereby and release said lever to allow said stop device to return to its normal operative position.

16. The combination, with an elevating carrier and a gravity carrier arranged to deliver packages in the path of said elevating carrier, of means adapted to move into the path of the packages and stop them temporarily on said gravity carrier, means adapted to be actuated by the movement of said elevating carrier to move said stop means out of operative position, means for locking said stop means in its inoperative position and means actuated by the subsequent movement of said elevating carrier for tripping said locking means and permitting said stop means to return to its normal operative position.

17. The combination, with an elevator including a belt and a package carrier supported thereon, of a gravity carrier arranged to deliver packages into the path of the elevating carrier, means arranged to engage the bottom of an incoming package and retard said package, means adapted to move into the path of the packages and stop them temporarily after they pass said retarding means and means for alternately moving said retarding means and said stopping means in and out of the path of the incoming package.

In witness whereof, I have hereunto set my hand this 23rd day of March 1909.

ALBERT S. DEHLER.

Witnesses:
 MARY G. LEAHY,
 VIRGIL W. TUCKER.